United States Patent
Fong

(10) Patent No.: US 8,943,861 B2
(45) Date of Patent: Feb. 3, 2015

(54) LENS THEFT PROTECTION DEVICE

(75) Inventor: Gary M. Fong, Kelowna (CA)

(73) Assignee: Gary Fong Photographic, Inc., Kelowna, BC (CA)

(\*) Notice: Subject to any disclaimer, the term of this patent is extended or adjusted under 35 U.S.C. 154(b) by 492 days.

(21) Appl. No.: 13/070,300

(22) Filed: Mar. 23, 2011

(65) Prior Publication Data

US 2012/0240641 A1 Sep. 27, 2012

(51) Int. Cl.
*E05B 73/00* (2006.01)
*E05B 67/38* (2006.01)
*G03B 11/04* (2006.01)
*G03B 17/56* (2006.01)

(52) U.S. Cl.
CPC ............ *E05B 67/383* (2013.01); *G03B 11/048* (2013.01); *G03B 17/56* (2013.01)
USPC ..................................... 70/58; 70/14; 70/164

(58) Field of Classification Search
USPC ........... 70/14, 58, 164, 229, 232, 416, 64–65; 24/551–553
See application file for complete search history.

(56) References Cited

U.S. PATENT DOCUMENTS

| | | | |
|---|---|---|---|
| 4,466,259 A * | 8/1984 | Osgood, Sr. .................... 70/164 |
| 5,531,083 A * | 7/1996 | Franck et al. .................... 70/58 |
| 5,602,530 A * | 2/1997 | Holmgren ................. 340/572.1 |
| 5,649,437 A * | 7/1997 | Royka et al. .................... 70/164 |
| 5,911,764 A * | 6/1999 | Wei Kong ........................ 70/160 |
| 6,745,437 B2 * | 6/2004 | Gremillion, III ............... 70/168 |
| 6,974,059 B2 * | 12/2005 | Alderman .......................... 70/58 |
| 7,197,904 B2 * | 4/2007 | Marcelle et al. ................ 70/164 |
| 7,797,972 B2 * | 9/2010 | Nickeas et al. ................. 70/163 |
| 7,961,099 B2 * | 6/2011 | Rendon et al. .................... 70/57 |
| 8,607,601 B1 * | 12/2013 | Wickesberg ...................... 70/58 |
| 2005/0211658 A1 * | 9/2005 | Bagration De Ulloa ....... 70/57.1 |
| 2009/0019626 A1 * | 1/2009 | Sullivan .......................... 70/164 |

OTHER PUBLICATIONS

Internet: http://www.manfrotto.com/; Manfrotto products; 030AT Anti Theft Camera Plate; Mar. 1, 2010, 1 page.

\* cited by examiner

*Primary Examiner* — Christopher Boswell

(74) *Attorney, Agent, or Firm* — Christie, Parker & Hale, LLP

(57) ABSTRACT

A theft prevention device including a housing comprising a base and a cam ring, the cam ring comprising at least one cam; an actuator rotatably coupled to the housing, wherein the actuator has a side wall defining a central space configured to receive an object; a coupler generally between the housing and the actuator, the coupler having teeth configured to engage the object in the central space; wherein the theft prevention device has an engaging orientation in which the coupler contacts the cam and wherein the teeth protrude from the side wall of the actuator.

11 Claims, 4 Drawing Sheets

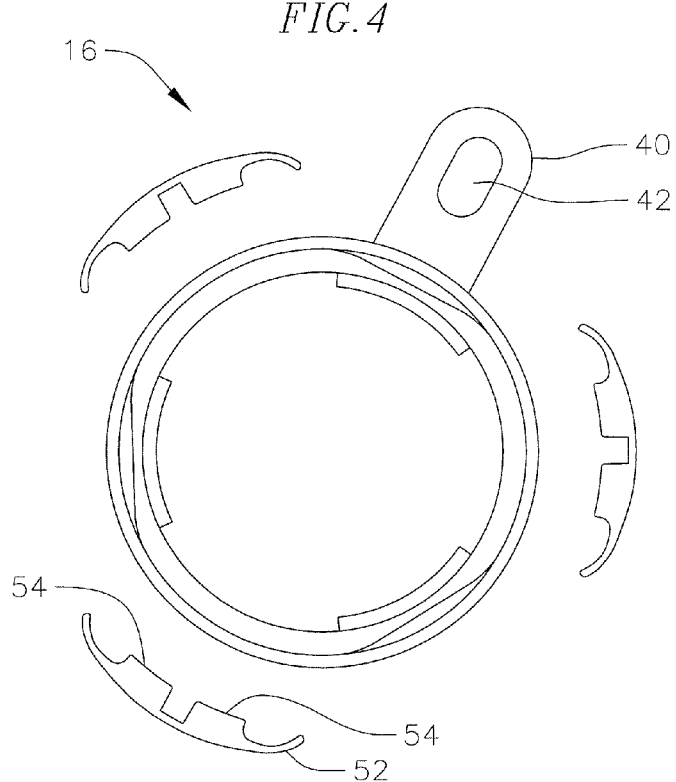
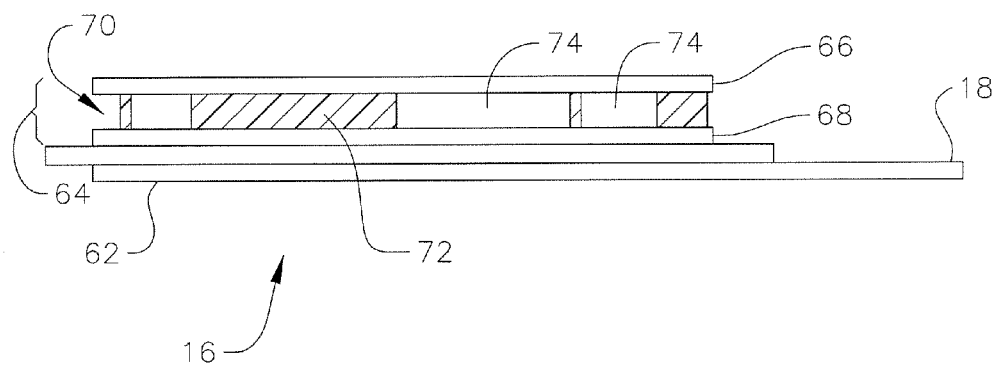

LENS THEFT PROTECTION DEVICE

FIELD

Embodiments of this invention relate generally to theft prevention devices, and more specifically, to theft prevention devices for camera lenses.

BACKGROUND

Photographic cameras are relatively expensive and desirable pieces of electronic equipment. Due to their relatively small size, cameras can be stolen fairly easily if left unattended for even a brief period of time, particularly at gatherings attended by a large number of people, such as weddings, concerts and sporting events. Additionally, while many cameras are quite small, it is still not always convenient for an owner to carry the camera around on his or her person at all times. Rather, the owner may want to set the camera down for a period of time, and yet a safe place to store the camera may not always be available.

In particular, single lens reflex (SLR) cameras are generally more expensive than "point-and-shoot" cameras because they often offer more features and options for a photographer as well as higher quality components. SLR cameras typically include a camera body that is configured to be coupled to one of many interchangeable lens to allow the photographer to switch out, for example, a fish-eye lens for a telephoto lens depending on the type of photograph desired and the photographer's distance from the subject.

Often, lenses can be almost as expensive or, in some cases, more expensive than the camera body, and thus, are a target of theft. Because lenses for SLR cameras can be uncoupled from the camera body, locking the camera body will not necessarily prevent theft of the lens, particularly if the camera body is locked in plain view.

SUMMARY

A theft prevention device including a housing comprising a base and a cam ring, the cam ring comprising at least one cam; an actuator rotatably coupled to the housing, wherein the actuator has a side wall defining a central space configured to receive an object; a coupler generally between the housing and the actuator, the coupler having teeth configured to engage the object in the central space; wherein the theft prevention device has an engaging orientation in which the coupler contacts the cam and wherein the teeth protrude from the side wall of the actuator.

In one embodiment, the base includes a lock tab having a lock opening, wherein the actuator comprises a lock tab having a lock opening, and wherein the lock opening of the base and the lock opening of the actuator are substantially aligned in the engaging orientation. Additionally, the theft prevention device has a disengaging orientation in which the lock tab of the base and the lock tab of the actuator are spaced from each other. In one embodiment, in the disengaging orientation the teeth of the coupler are configured to be substantially flush with or recessed from the side wall of the actuator.

In one embodiment, the theft prevention device can be moved between the engaging orientation and the disengaging orientation by rotation of the actuator with respect to the housing. Additionally, the side wall of the actuator may have openings adapted to accommodate the teeth of the coupler.

BRIEF DESCRIPTION OF THE DRAWINGS

FIG. 4 is an exploded plan view of an actuator of the lens theft prevention device of FIG. 1.

FIG. 5 is a side view of the actuator of FIG. 4.

DETAILED DESCRIPTION

Figure 1:
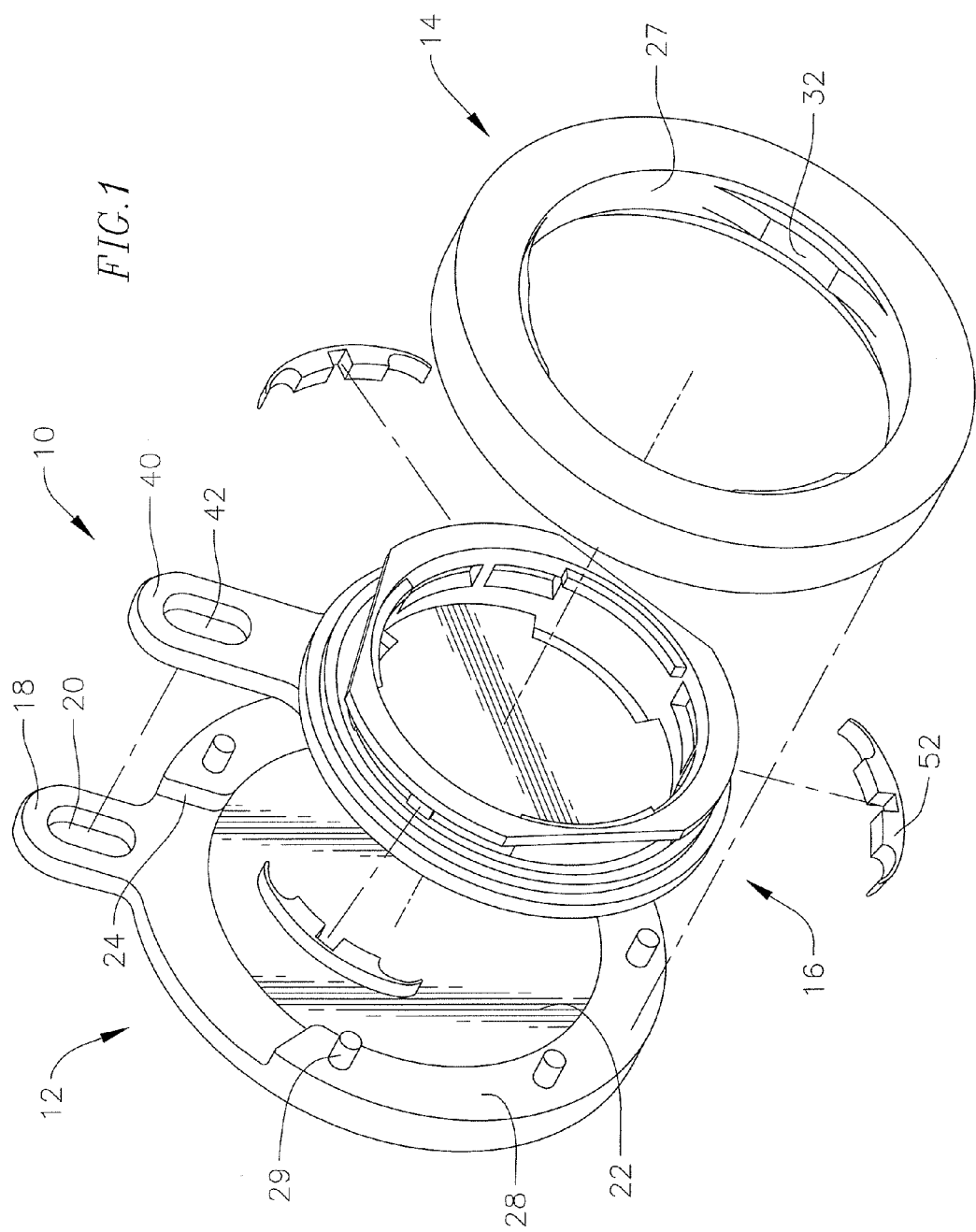
FIG. 1 is an exploded perspective view of a lens theft prevention device according to an embodiment of the present invention.
Figure 2:
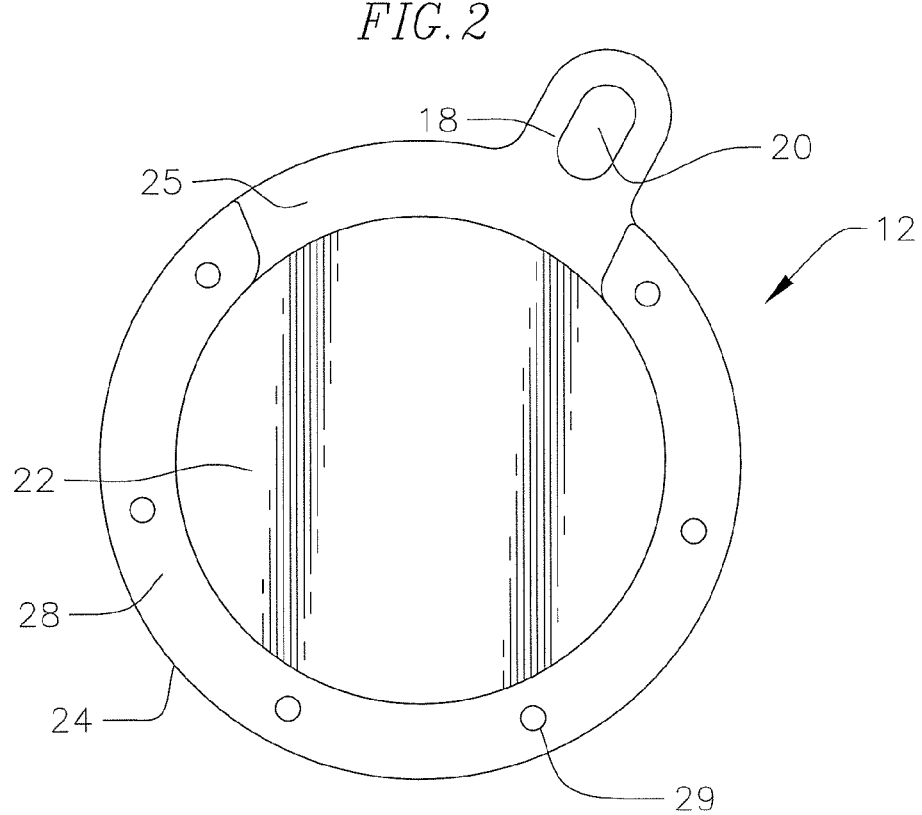
FIG. 2 is a plan view of a base of the lens theft prevention device of FIG. 1.

In general, embodiments of the present invention are directed to a theft prevention device for a lens of a photographic camera. More specifically, the lens theft prevention device can be mounted to one side of the lens by a user to allow the lens to be locked to another object to prevent or reduce the likelihood of theft of the lens. Additionally, in one embodiment, the lens theft prevention device blocks the side of the lens such that the theft prevention device would have to be forcibly removed from the lens before the lens could be used, thereby additionally deterring theft of the lens. As will be appreciated, although embodiments of the present invention are directed towards camera lenses, the device could also be used with other objects to prevent the theft thereof.

With reference now to the figures, the lens theft prevention device 10 includes a base 12 and a cam ring 14 fixedly mounted to the base to generally form a housing. The lens theft prevention device 10 further includes an actuator 16 generally between the base 12 and the cam ring 14, the actuator being movable between an engaged position and a disengaged position to respectively lock and unlock the theft prevention device with respect to a lens, as described in more detail below.

In one embodiment, the base 12 has a generally circular periphery and includes a bottom surface 22 configured to cover a face of a lens when attached thereto and a side wall 24 protruding from and extending around a portion of the periphery of the bottom surface. The side wall 24 further defines a substantially central space adapted to accommodate the actuator 16. Additionally, the side wall 24 extends around about 290 degrees of the bottom surface, thereby defining an "omitted section" or recess 25 that provides a space to accommodate a lock tab 40 of the actuator. As such, the actuator 16 can rotate with respect to the base 12 and the cam ring 14 when the base and a cam ring are combined to form the housing, as described below.

In one embodiment, a plurality of pins 29 protrude from a top surface or ledge 28 of the side wall 24, the pins being spaced from each other around the ledge 28 and configured to engage sockets 30 (FIG. 3) on the cam ring 14 to form the housing. The pins 29 may be integral with the base 12 or may be separately manufactured and coupled to the side wall 24. As will be appreciated, the base 12 and the cam ring 14 may also be combined in other ways, such as by an adhesive, thermal bonding, clips, or the base and the cam ring may be a single integral component.

The base 12 includes a lock tab 18 extending radially outward from the periphery. The lock tab 18 has an opening 20 configured to receive a lock, such as a padlock, to lock the device 10 to an appropriate structure. The lock tab 18 is integral with the base 12, but may also be formed separately and then coupled to the base.

The base 12 may be made from a substantially rigid material, such as acrylonitrile butadiene styrene (ABS), or another similar material, and may be of a thickness such that the base is not easily fractured when a force is applied thereto. In one embodiment, the bottom surface 22 of the base 12 has a thickness of about 0.125 inch and the bottom surface and the side wall 24 together have a thickness of about 0.25 inch. However, it will be appreciated that the base may have any dimensions that allow it to be used as intended.

Figure 3:
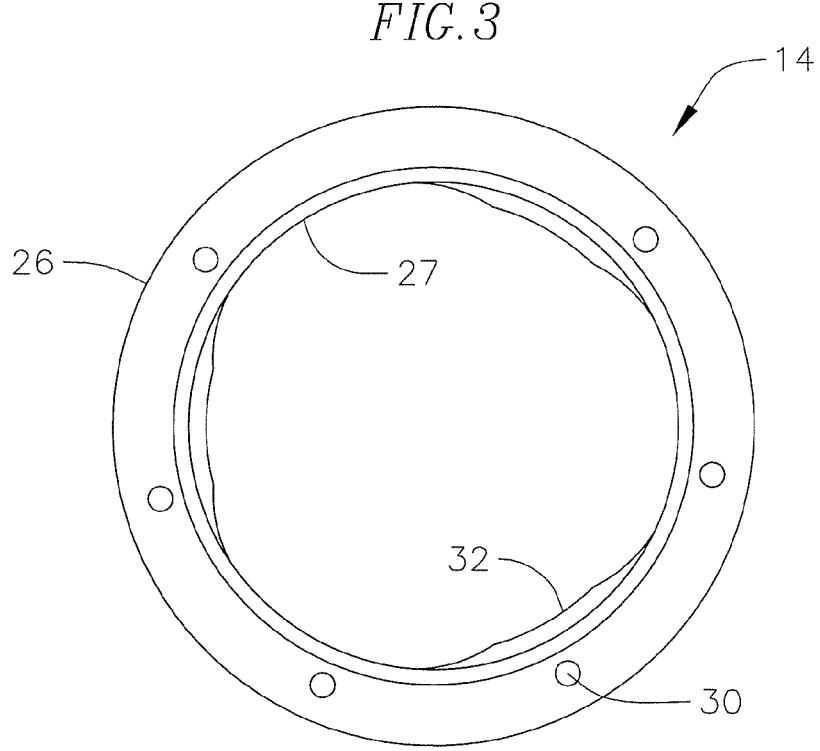
FIG. 3 is a plan view of a cam ring of the lens theft prevention device of FIG. 1.

With reference now also to FIG. 3, the cam ring 14 has an outer periphery wall 26 that substantially matches the outer periphery of the base 12 and an inner periphery wall 27 that substantially matches the inner periphery of the side wall 24 of the base. The cam ring 14 includes sockets 30 that extend partially through the cam ring and are configured to receive the pins 29 from the base 12 to attach the cam ring 14 to the base 12. It will be appreciated that rather than pins and sockets, the base 12 and the cam ring 14 may be attached together by other fasteners such as clips, snaps, screws, bolts or welds, for example, and that the cam ring may be configured to accommodate any suitable fastener.

The inner periphery wall 27 of the cam ring 14 includes a plurality of cams 32 in the form of protrusions or bumps that are configured to engage couplers 52 (FIG. 1) located between the inner periphery wall and the actuator 16. The cams 32 are substantially arc-shaped and have smooth rounded edges to cleanly engage the couplers 52. As described in more detail below, when the actuator 16 is rotated, the couplers 52 contact the cams 32 so that they are moved radially toward a center of the housing 11 which allows the couplers to engage the lens and be coupled thereto. As shown in FIG. 3, the cam ring 14 has three cams 32, but it will be appreciated that the cam ring 14 could have fewer or more cams.

With reference now also to FIGS. 4 and 5, the actuator 16 is configured to be housed generally within the housing and is adapted to be rotated with respect to the housing to operate the theft prevention device 10. The actuator 16 includes a substantially planar surface 62 and a support wall 64 protruding from the planar surface 62 for supporting the couplers 52. The support wall 64 includes first and second rims 66, 68 that extend around an entire circumference of the support wall, and coupler partitions 72 that are between the first and second rims and extend partially around the circumference of the support wall, the coupler partitions defining coupler openings 74 configured to house the couplers 52, as described below.

With reference to FIG. 4, the actuator has a lock tab 40 that generally corresponds to the lock tab 18 on the base 12, the lock tab extending radially from the planar surface 62 and having a lock opening 42 configured to be aligned with the lock opening 20 on the lock tab 18. When the lock openings 20, 42 are aligned on the device 10, a lock can be inserted through the openings to lock the actuator 16 with respect to the cam ring 14 and thereby prevent the device 10 from being removed from a lens.

As shown in FIG. 5, the first and second rims 66, 68 have a greater diameter than the coupler partitions 72, and thereby extend past the coupler partitions to form a groove 70. The cams 32 on the cam ring 14 extend into the groove 70 to couple the cam ring and the actuator 16 together and allow the actuator to rotate relative to the cam ring within the groove. The coupler partitions 72 are spaced along a periphery of the actuator 16 such that teeth 54 of the couplers 52 protrude through the coupler openings 74 between the coupler partitions. In one embodiment, the actuator has six openings divided into three sets of two openings to accommodate three couplers 52 each having two teeth 54. It will be appreciated, however, that the specific configuration and number of openings 74 is limited to those described, but rather could be modified to accommodate a different number of couplers having a different number of teeth.

Couplers 52 are provided for coupling the lens theft prevention device 10 to a lens. With reference to FIG. 4, each coupler 52 is generally arc-shaped to generally conform to a curvature of the actuator and has a pair of teeth 54 for engaging a lens. The teeth 54 can protrude through the openings 74 when the coupler is located between the actuator 16 and the cam ring 14 and the teeth may have a roughened surface to provide traction to more secure attach the theft prevention device 10 to a lens, as described in more detail below. In one embodiment, lateral edges of the coupler 52 may be curved to a degree greater than a curvature of the actuator 16 to ensure that they slide relatively seamlessly over the cams 32 and do not catch an edge on the cam which would prevent the teeth from being able to couple the device 10 to a lens.

Figure 6:
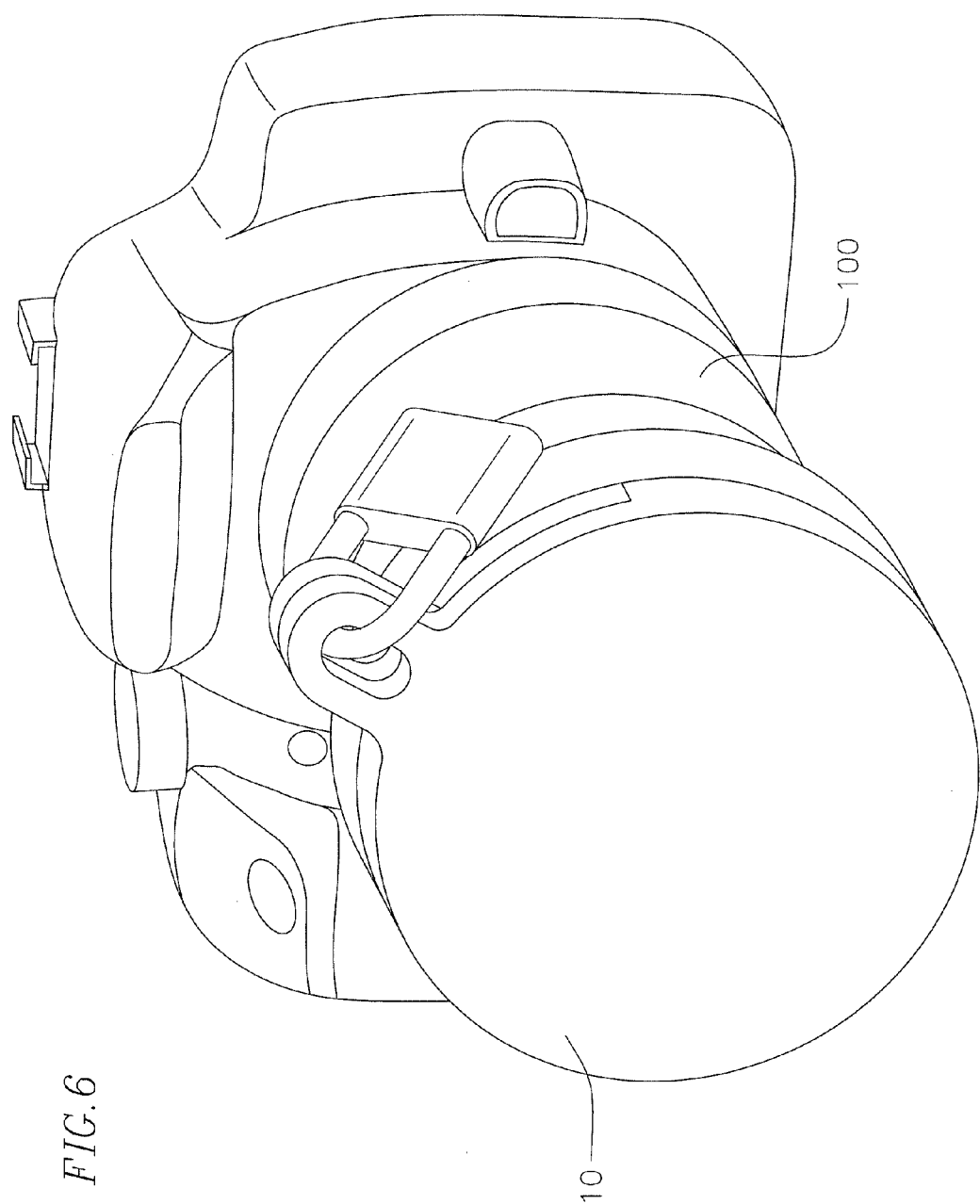
FIG. 6 is a schematic perspective view of an embodiment of a lens theft protection device coupled to a camera.

Operation of the lens theft prevention device will now be described in more detail, with reference also to FIG. 6. As shown in FIG. 1, the base 12 and the cam ring 14 are coupled together to form the housing with the actuator 16 substantially between the base and the cam ring. As noted above, the actuator 16 is coupled to the housing and is rotatable with respect to the housing such that the cams 32 on the cam ring 14 can engage the couplers 52 in the groove 70 on the actuator. Additionally, when the device 10 is assembled, a central space 80 defined by the actuator 16 and the housing 11 provides an area for accommodating a camera lens 100.

The couplers 52 are coupled to the actuator 16 via teeth 54 that extend through the openings 74 in the actuator, and the couplers are prevented from being uncoupled from the actuator by the inner periphery wall 27. The teeth can protrude into the central space 80 to engage a lens that has been inserted into the central space.

To couple the theft prevention device 10 to a lens 100, the device is configured into a disengaging orientation in which the couplers 52 are generally not aligned with the cams 32, allowing the teeth 54 of the couplers 52 to be substantially flush with or recessed from an interior wall of the coupler partitions 72 of the actuator 16. Additionally, in one embodiment, the openings 20, 42 of the respective lock tabs 18, 40 are not aligned in the disengaging orientation. Accordingly, the device can be inserted onto the lens 100 such that a portion of the lens protrudes into the central space 80. Once the lens is in the central space 80, the actuator 16 can be rotated with respect to the housing 11 into an engaging position, causing each coupler 52 to engage a respective cam 32 and forcing the couplers 52 radially toward a center of the device 10 to thereby engage the lens 100. As will be appreciated, camera lenses often have grooves extending around a periphery thereof, and when the device 10 is rotated from the disengaging orientation to the engaging orientation, the teeth 54 of the couplers 52 can penetrate the grooves in the lens to couple the device to the lens. However, even if a surface of the lens is substantially smooth, the teeth 54 can still grip the lens and thereby couple the device 10 to the lens.

In the engaging orientation, the couplers 52 are generally aligned with the cams 32 such that the cams prevent the teeth 54 of the couplers from being moved away from the lens 100, thereby allowing the device 10 to remain coupled to the lens in the engaging orientation. Further, in the engaging orientation the lock openings 20, 42 of the respective lock tabs 18, 40 on the base 12 and on the actuator 16 are substantially aligned, allowing a lock to be inserted through the lock openings and then be lock to another object or to at least lock the device 10 to the lens. Since the device 10 covers the lens, thereby preventing the lens from being used as intended, even locking the device to the lens without locking the device to anything else would have at least some deterrent effect. As will be appreciated, when a user wants to uncouple the theft prevention device 10 from a lens, the user can move the actuator 16 so that the device is in the disengaging position, and then the user can separate the device from the lens.

Although the lens theft prevention device according to exemplary embodiments of the present invention has been described for illustrative purposes, those skilled in the art will appreciate that various modifications are possible without departing from the scope and spirit of the invention as disclosed in the appended claims.

What is claimed is:

1. A theft prevention device comprising:
   a base;
   a cam ring directly connected to the base, the cam ring comprising a side wall having at least one cam extending along an interior-facing surface of the side wall;
   an actuator rotatably located between the base and the cam ring, wherein the actuator has a side wall defining a central space configured to receive an object and wherein an exterior-facing surface of the side wall of the actuator is adjacent to the interior-facing surface of the side wall of the cam ring;
   a coupler generally between the cam ring and the actuator, the coupler having teeth configured to engage the object in the central space;
   wherein the theft prevention device has an engaging orientation in which the coupler contacts the cam and wherein the teeth protrude from the side wall of the actuator.

2. The theft prevention device of claim 1, wherein the base comprises a lock tab having a lock opening, wherein the actuator comprises a lock tab having a lock opening, and wherein the lock opening of the base and the lock opening of the actuator are substantially aligned in the engaging orientation.

3. The theft prevention device of claim 2, wherein the theft prevention device has a disengaging orientation in which the lock tab of the base and the lock tab of the actuator are spaced from each other.

4. The theft prevention device of claim 3, wherein in the disengaging orientation the teeth of the coupler are configured to be substantially flush with or recessed from the side wall of the actuator.

5. The theft prevention device of claim 3, wherein the theft prevention device can be moved between the engaging orientation and the disengaging orientation by rotation of the actuator with respect to the base.

6. The theft prevention device of claim 1, wherein the side wall of the actuator defines a substantially circular central space.

7. The theft prevention device of claim 1, further comprising a plurality of additional couplers and a plurality of additional cams.

8. The theft prevention device of claim 1, wherein the coupler is generally arc-shaped.

9. The theft prevention device of claim 1, wherein the side wall of the actuator has openings adapted to accommodate the teeth of the coupler.

10. The theft prevention device of claim 1, wherein the cam ring comprises a plurality of cams.

11. The theft prevention device of claim 1, wherein the actuator defines a peripheral groove configured to receive the cam.

* * * * *